US012664952B2

(12) United States Patent
Cashen et al.

(10) Patent No.: US 12,664,952 B2
(45) Date of Patent: Jun. 23, 2026

(54) FULL ARRAY LOCAL DIMMING GRAPHICS OPTIMIZATION FOR AUTOMOTIVE HEADS-UP DISPLAY

(71) Applicant: FCA US LLC, Auburn Hills, MI (US)

(72) Inventors: Daniel Cashen, Troy, MI (US); Esaias Pech, Rochester, MI (US); Adinath Jadhav, Bangalore (IN)

(73) Assignee: FCA US LLC, Auburn Hills, MI (US)

( * ) Notice: Subject to any disclaimer, the term of this patent is extended or adjusted under 35 U.S.C. 154(b) by 178 days.

(21) Appl. No.: 18/589,510

(22) Filed: Feb. 28, 2024

(65) Prior Publication Data

US 2025/0273175 A1 Aug. 28, 2025

(51) Int. Cl.
*G09G 3/34* (2006.01)
*G09G 3/00* (2006.01)

(52) U.S. Cl.
CPC ........... *G09G 3/3426* (2013.01); *G09G 3/002* (2013.01); *G09G 2320/0686* (2013.01); *G09G 2320/0693* (2013.01); *G09G 2330/023* (2013.01); *G09G 2340/0478* (2013.01); *G09G 2380/10* (2013.01)

(58) Field of Classification Search
CPC ................. G09G 3/3426; G09G 3/002; G09G 2320/0686; G09G 2320/0693; G09G 2330/023; G09G 2340/0478; G09G 2380/10
USPC .......... 345/156, 522, 694; 358/509; 382/154
See application file for complete search history.

(56) References Cited

U.S. PATENT DOCUMENTS

| | | | | |
|---|---|---|---|---|
| 6,359,737 | B1 | 3/2002 | Stringfellow | |
| 6,646,810 | B2 | 11/2003 | Harter et al. | |
| 7,095,562 | B1 | 8/2006 | Peng et al. | |
| 10,606,076 | B2 | 3/2020 | Chauveau | |
| 11,435,580 | B1 * | 9/2022 | Sneitzer | B64D 43/00 |
| 11,694,643 | B2 | 7/2023 | Roever et al. | |
| 2011/0052042 | A1 * | 3/2011 | Ben Tzvi | G06V 20/56 382/154 |
| 2013/0222235 | A1 * | 8/2013 | Abdollahi | G06F 3/013 345/156 |
| 2014/0059472 | A1 * | 2/2014 | Zhaiek | G06F 3/04842 715/773 |
| 2017/0085867 | A1 * | 3/2017 | Baran | B41M 3/008 |
| 2018/0273200 | A1 * | 9/2018 | De Villele | B64C 9/32 |
| 2019/0243133 | A1 * | 8/2019 | Liao | B60K 35/22 |
| 2019/0287467 | A1 | 9/2019 | Ledermann et al. | |
| 2022/0020318 | A1 * | 1/2022 | Sasaoka | G09G 3/2014 |

(Continued)

OTHER PUBLICATIONS

Daniel Cashen et al., "HUD System Optical Efficiency Improvements: Leveraging Full Array Local Dimming (FALD)", Conference: SID Detroit, Sep. 2022.

*Primary Examiner* — Prabodh M Dharia
(74) *Attorney, Agent, or Firm* — Jeremy J. Klobucar

(57) ABSTRACT

An automotive heads-up display (HUD) calibration system includes a back-lit HUD system of an automobile, the back-lit HUD system being configured for full array local dimming (FALD) via a plurality of independently-controlled back-lit regions, and a computing system configured to optimize a set of graphics for projection by the back-lit HUD system to reduce energy consumption by the FALD control of the back-lit HUD system, where the computing system is an external computing system that is only associated with the back-lit HUD system temporarily in a calibration environment.

14 Claims, 3 Drawing Sheets

(56) References Cited

U.S. PATENT DOCUMENTS

| | | | | |
|---|---|---|---|---|
| 2023/0274712 | A1 * | 8/2023 | Akiba | G09G 3/36<br>345/694 |

* cited by examiner

FULL ARRAY LOCAL DIMMING GRAPHICS OPTIMIZATION FOR AUTOMOTIVE HEADS-UP DISPLAY

FIELD

The present application generally relates to automotive heads-up display (HUD) systems and, more particularly, to techniques for full array local dimming (FALD) graphics optimization for an automotive HUD.

BACKGROUND

In automotive applications, a heads-up display (HUD) system includes a portion of a front windshield that is treated or processed in such a way that a projected image will reflect back to a driver of the automobile. This projected image could include, for example only, a speed and transmission gear of the vehicle, a speed limit of a road that the vehicle is traveling on, and a navigational direction that the vehicle is traveling. Conventional HUD systems are inefficient as they require significant input power to overcome exterior lighting conditions (e.g., sunlight) through a lossy optical system. As such, only a small percentage of the light generated makes its way back to the driver's eye(s), with the majority of the energy being converted to heat. This excess heat must be handled to avoid potentially damaging component(s). Accordingly, while such conventional automotive HUD systems do work well for their intended purpose, there exists an opportunity for improvement in the relevant art.

SUMMARY

According to one example aspect of the invention, an automotive heads-up display (HUD) calibration system is presented. In one exemplary implementation, the automobile HUD calibration system comprises a back-lit HUD system of an automobile, the back-lit HUD system being configured for full array local dimming (FALD) via a plurality of independently-controlled back-lit regions and a computing system configured to optimize a set of graphics for projection by the back-lit HUD system to reduce energy consumption by the FALD control of the back-lit HUD system, wherein the computing system is an external computing system that is only associated with the back-lit HUD system temporarily in a calibration environment.

In some implementations, a graphics designer is configured to provide inputs via the computing system to optimize the set of graphics. In some implementations, the computing system is configured to optimize the set of graphics by laterally shifting a particular graphic of the set of graphics such that less energy is consumed by the FALD control of the back-lit HUD system. In some implementations, the computing system is configured to optimize the set of graphics by requiring a lesser quantity of the plurality of independently-controlled back-lit regions for the back-lit HUD system. In some implementations, the computing system is configured to optimize the set of graphics by allowing for different configurations of the plurality of independently-controlled back-lit regions for the back-lit HUD system. In some implementations, the back-lit HUD system comprises a separate control system that receives, stores, and utilizes the optimized set of graphics from the computing system.

In some implementations, the back-lit HUD system comprises a back-lit reflective portion of a windshield of the automobile, the back-lit reflective portion of the windshield comprising an array of light-emitting diodes (LEDs) corresponding to the plurality of independently-controlled back-lit regions, a projection system configured to project light onto the back-lit reflective portion of the windshield, and a control system configured to receive and store the optimized set of graphics from the computing system and to control the projection system based on the optimized set of graphics. In some implementations, the array of LEDs are a part of thin-film transistor (TFT) system.

According to another example aspect of the invention, a calibration method for a back-lit HUD system of an automobile is presented. In one exemplary implementation, the calibration method comprises providing the back-lit HUD system, the back-lit HUD system being configured for FALD via a plurality of independently-controlled back-lit regions and optimizing, by a computing system, a set of graphics for projection by the back-lit HUD system to reduce energy consumption by the FALD control of the back-lit HUD system, wherein the computing system is an external computing system that is only associated with the back-lit HUD system temporarily in a calibration environment.

In some implementations, a graphics designer is configured to provide inputs via the computing system to optimize the set of graphics. In some implementations, optimizing the set of graphics comprises laterally shifting a particular graphic of the set of graphics such that less energy is consumed by the FALD control of the back-lit HUD system. In some implementations, optimizing the set of graphics comprises requiring a lesser quantity of the plurality of independently-controlled back-lit regions for the back-lit HUD system. In some implementations, optimizing the set of graphics comprises allowing for different configurations of the plurality of independently-controlled back-lit regions for the back-lit HUD system. In some implementations, the back-lit HUD system comprises a separate control system that receives, stores, and utilizes the optimized set of graphics from the computing system.

In some implementations, the back-lit HUD system comprises a back-lit reflective portion of a windshield of the automobile, the back-lit reflective portion of the windshield comprising an array of LEDs corresponding to the plurality of independently-controlled back-lit regions, a projection system configured to project light onto the back-lit reflective portion of the windshield, and a control system configured to receive and store the optimized set of graphics from the computing system and to control the projection system based on the optimized set of graphics. In some implementations, the array of LEDs are a part of TFT system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional automotive heads-up display (HUD) systems are inefficient as they require significant input power to overcome exterior lighting conditions (e.g., sunlight) through a lossy optical system. As such, only a small percentage of the light generated makes its way back to the driver's eye(s), with the majority of the energy being converted to heat. This excess heat must be handled to avoid potentially damaging component(s). Accordingly, improved automotive HUD calibration and control systems and methods are presented herein. These systems and methods leverage full array local dimming (FALD), in which individually-controlled back-lit regions are utilized to improve display contrast while also reducing power consumption of an automobile HUD system. Conventional FALD lighting systems do not have a feedback loop for optimization. Thus, depending on how a set of graphics are designed (e.g., placement/orientation) for display by the HUD system, however, certain individually-controlled regions could provide unnecessary backlighting.

In one aspect, this involves the calibration (e.g., via an external computing system) or optimization of a set of graphics for display by the HUD system. This optimized set of graphics, which could be specifically designed by a graphics designer via a separate calibration computing system (i.e., separate from a control system of the HUD system), provides for reduced power consumption compared to conventional or non-optimized sets of graphics. This calibration process could involve the graphics designer determining more optimal graphics that still achieve a desired appearance. For example, this could involve laterally shifting (left/right, up/down, or some combination thereof) a particular graphic such that its projection and power consumption is reduced. This could also include utilizing lesser individually-controlled back-lit regions (e.g., light-emitting diodes, or LEDs) or a different arrangement thereof (e.g., not a square-shaped array).

Figure 1:
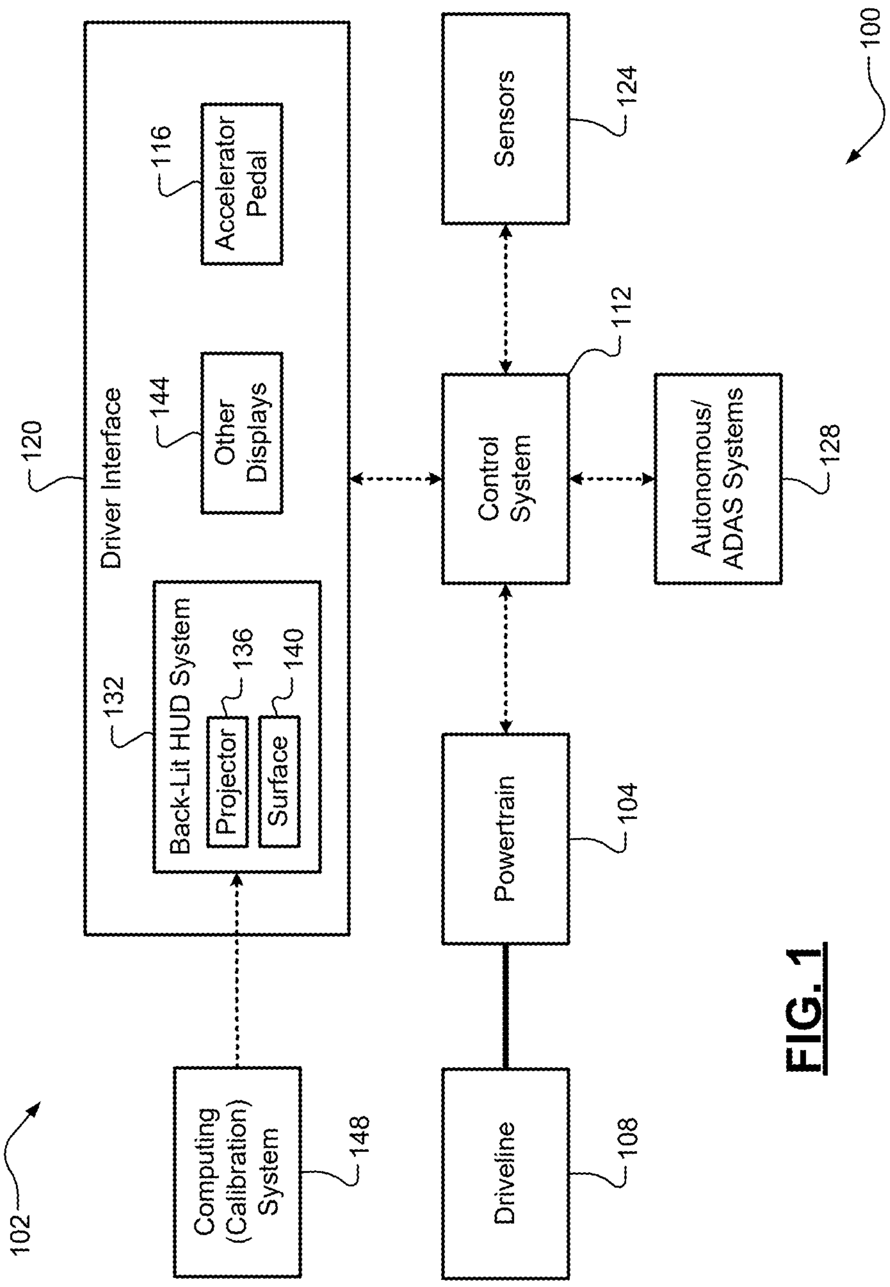
FIG. 1 is a functional block diagram of an automobile having an example back-lit heads-up display (HUD) system according to the principles of the present application.

Referring now to FIG. 1, a functional block diagram of an automobile 100 having an example HUD calibration system 102 according to the principles of the present application is illustrated. The automobile 100 generally comprises a powertrain 104 that is configured to generate and transfer drive torque to a driveline 108 for propulsion. Non-limiting examples of the components of the powertrain 104 include an internal combustion engine, one or more electric motors, and an automatic transmission. A control system 112 controls operation of the automobile 100, including primarily controlling the powertrain 104 to generate and transfer an amount of drive torque to the driveline 108 to satisfy a torque request provided by a driver of the automobile 100 via an accelerator pedal 116 or other suitable device of a driver interface 120. The control system 112 can perform this control based on measurements from a set of sensors 124 of the automobile 100, which are configured to measure a variety of desired operating parameters (speeds, torques, temperatures, pressures, etc.). In some implementations, the control system 112 is also configured to control a set of advanced driver-assistance (ADAS) or autonomous driving systems 128 of the automobile 100. Non-limiting examples of these systems 156 include adaptive cruise control (ACC), object detection/classification, and automated lane keeping/centering.

In one exemplary implementation, the control system 112 includes some combination of one or more application-specific integrated circuits (ASICs), central processing units (CPUs), graphical processing units (GPUs), and neural processing units (NPUs). The control system 112 could include a plurality, for example, of electronic control units (ECUs) that each have their own processors (an engine control module, a transmission control module, a hybrid control processor, etc.). The driver interface 120 includes an HUD system 132 comprising a projector or projection system 136 and a back-lit surface 140 (e.g., a back-lit reflective portion of a windshield of the automobile 100). It will be appreciated that the HUD system 132 could be controlled by the control system 112 or its own separate or standalone control system (not specifically shown). The driver interface 120 could also include other components such as one or more additional displays 144 (an instrument panel cluster (IPC), an infotainment unit, etc.). The automotive HUD calibration system 102 according to the principles of the present application also includes an external computing (calibration) system 148 that is configured to optimize a set of graphics for reduced power consumption and improved efficiency via FALD control of the HUD system 132.

Figure 2A:
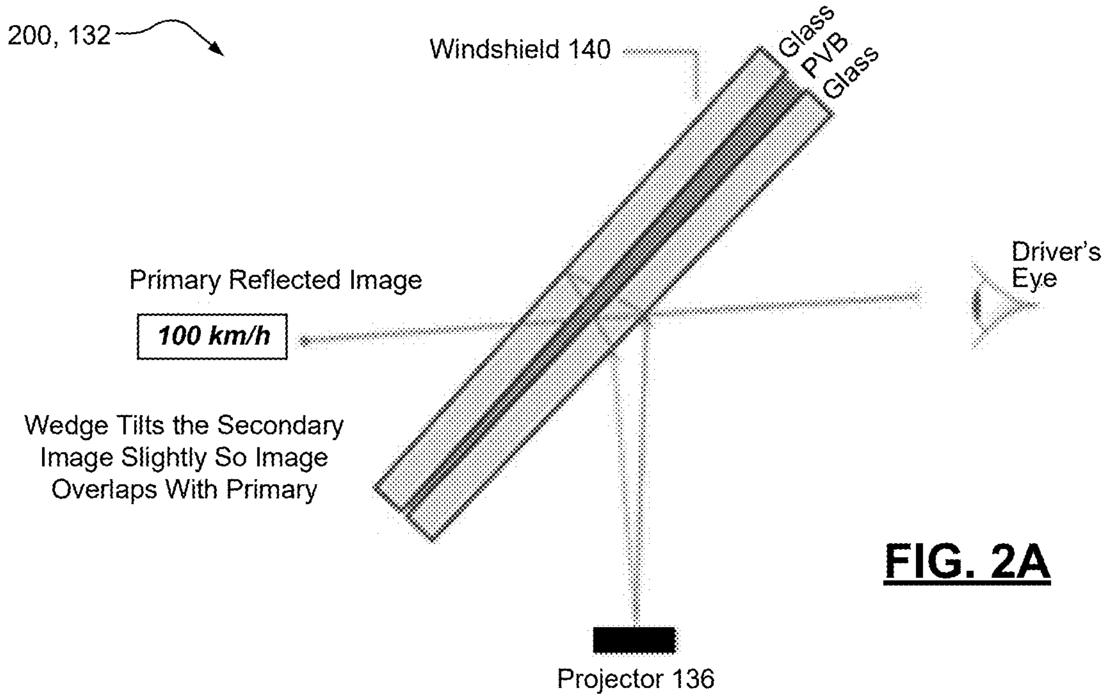
FIGS. 2A-2B are diagrams of an example configuration and projection by the back-lit automotive HUD system according to the principles of the present application.
Figure 2B:
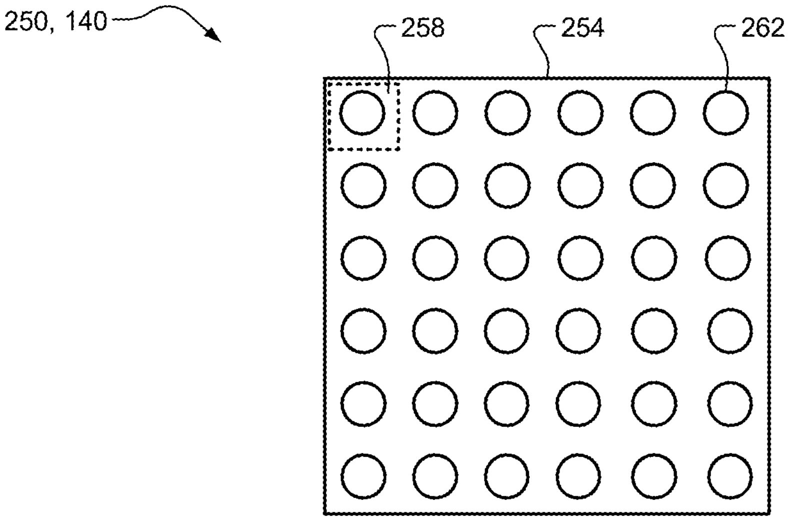

Referring now to FIGS. 2A-2B, diagrams of an example configuration and projection by the back-lit automotive HUD system according to the principles of the present application are illustrated. In a first configuration 200 of FIG. 2A, the back-lit reflective surface 140 is a reflective portion of a windshield (also "windshield 140") of the automobile 100. While the windshield 140 appears to be flat as shown, it will be appreciated that the windshield 140 often has a slight curvature. The projector 136 projects a graphic or image into the windshield 140, which is shown to be a speed of 100 km/h. As shown, the windshield 140 could comprise two panes or pieces of glass with a reflective polyvinyl butyral (PVB) layer or another suitable reflective material layer therebetween. In some implementations, this PVB layer has a slight wedge shape as shown such that a secondary image (from one of the glass panes) overlaps with the primary reflected image for viewing by a driver's eye. FIG. 2B illustrates an example configuration 250 of a back-lit portion 254 of the surface 140 (e.g., the windshield). As shown, there are a plurality of independently-controlled back-lit regions 258, which could correspond to a plurality of independently-controlled LEDs 262 (e.g., a 6×6 or 36 zone/pixel array as shown). This independent control of the regions/LEDs 258/262 allows for FALD control. For example, this back-it portion 254 could be part of a thin-film transistor (TFT) display system.

Figure 3:
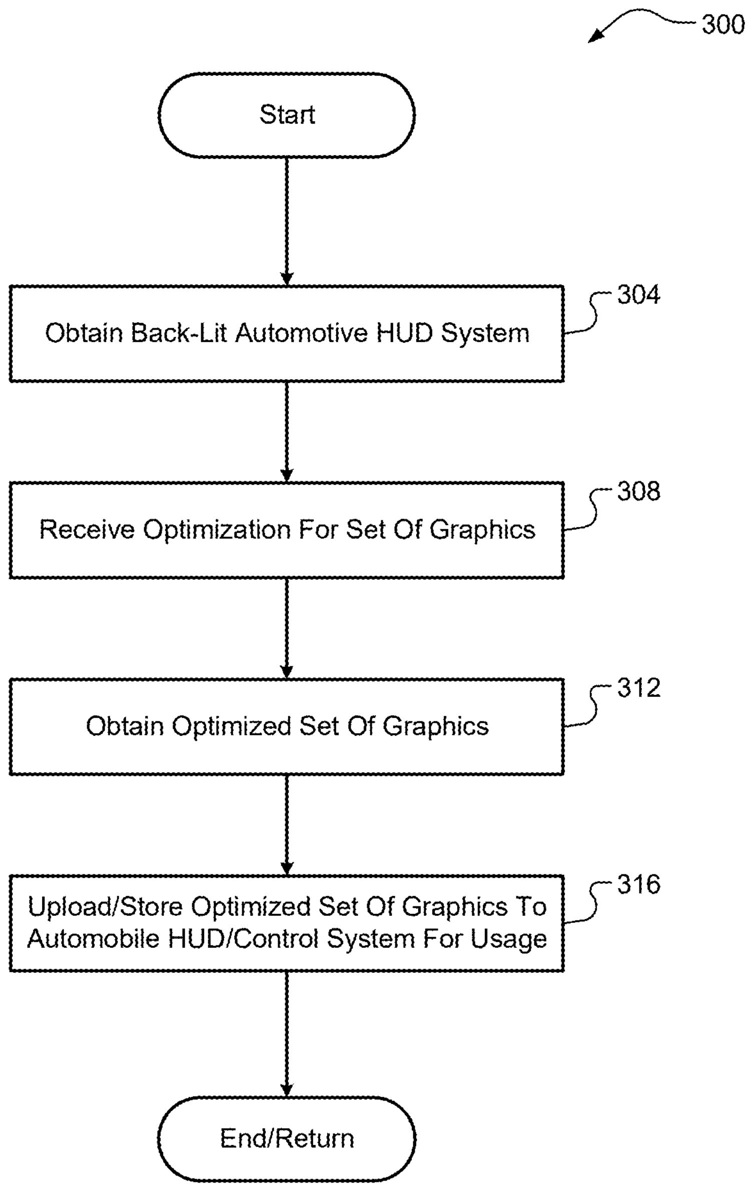
FIG. 3 is a flow diagram of an example graphics optimization method for a back-lit automotive HUD according to the principles of the present application.

Referring now to FIG. 3 and with continued reference to FIG. 1 and FIGS. 2A-2B, a flow diagram of an example graphics optimization method 300 for a back-lit automotive HUD according to the principles of the present application is illustrated. While the following description of the method 300 references components of the automobile 100, it will be appreciated that the method 300 could be applicable to any suitably configured automobile and corresponding HUD system. At 304, the back-lit HUD system 132 of the automobile 100 is provided. At 308, the computing system 148 receives, from a user (e.g., a graphics designer), inputs for optimization of a set of graphics for display by the back-lit HUD system 132. This could include, for example, initially obtaining a base or default set of graphics and then receiving customization inputs that optimize the set of graphics. In some implementations, the optimization of the set of graphics comprises laterally shifting a particular graphic of the set of graphics such that less energy is consumed by the FALD control of the back-lit HUD system 132.

In some implementations, the optimization of the set of graphics comprises requiring a lesser quantity of the plurality of independently-controlled back-lit regions 258/262 for the back-lit HUD system 132. In some implementations, the optimization of the set of graphics comprises allowing for different configurations of the plurality of independently-controlled back-lit regions for the back-lit HUD system (e.g., not a square or rectangular, or an irregular array). At 312, after optimization, the computing system 148 obtains an optimized set of graphics. At 316, the HUD system 132 (e.g., the control system 112) of the automobile 100 receives the optimized set of graphics and stores then for future usage in controlling the HUD system 132 (i.e., the projector 136 to control projection of optimized graphics on the back-lit surface) to achieve reduced power consumption. The method 300 then ends or returns to 304. It will also be appreciated that this method 300 could be divided into two sub-methods (e.g., one offline calibration/optimization method and another online usage/HUD control method).

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An automotive heads-up display (HUD) calibration system, the automobile HUD calibration system comprising:

a back-lit HUD system of an automobile, the back-lit HUD system being configured for displaying graphics on a surface of the automobile via projection and full array local dimming (FALD) via a plurality of independently-controlled back-lit regions; and a computing system configured to:

obtain a non-optimized set of graphics for display by the back-lit HUD system, perform an energy consumption analysis of the back-lit HUD system for projection and FALD of the non-optimized set of graphics, and, based on the energy consumption analysis, optimize the non-optimized set of graphics to obtain an optimized set of graphics for display by the back-lit HUD system, wherein the computing system is an external computing system that is only associated with the back-lit HUD system temporarily in a calibration environment, wherein the back-lit HUD system is further configured to receive and store the optimized set of graphics and to control the projection and FALD of the optimized set of graphics, and wherein the projection and FALD of the optimized set of graphics requires less energy consumption compared to projection and FALD of the non-optimized set of graphics.

2. The automotive HUD calibration system of claim 1, wherein the computing system is further configured to receive, from a graphics designer, inputs to optimize the non-optimized set of graphics.

3. The automotive HUD calibration system of claim 1, wherein the computing system is further configured to optimize the non-optimized set of graphics by laterally shifting a particular graphic of the non-optimized set of graphics such that less energy is consumed by the FALD of the back-lit HUD system.

4. The automotive HUD calibration system of claim 1, wherein the computing system is further configured to optimize the non-optimized set of graphics by requiring a lesser quantity of the plurality of independently-controlled back-lit regions for the back-lit HUD system.

5. The automotive HUD calibration system of claim 1, wherein the computing system is further configured to optimize the non-optimized set of graphics by allowing for different configurations of the plurality of independently-controlled back-lit regions for the back-lit HUD system.

6. The automotive HUD calibration system of claim 1, wherein the back-lit HUD system comprises:

the surface, wherein the surface includes a back-lit reflective portion of a windshield of the automobile, the back-lit reflective portion of the windshield comprising an array of light-emitting diodes (LEDs) corresponding to the plurality of independently-controlled back-lit regions;

a projection system configured to project light onto the back-lit reflective portion of the windshield; and a control system configured to receive and store the optimized set of graphics from the computing system and to control the projection system and the array of LEDs based on the optimized set of graphics.

7. The automotive HUD calibration system of claim 6, wherein the array of LEDs are a part of thin-film transistor (TFT) system.

8. A calibration method for a back-lit heads-up display (HUD) system of an automobile, the calibration method comprising:

providing the back-lit HUD system, the back-lit HUD system being configured for displaying graphics on a surface of the automobile via projection and full array local dimming (FALD) via a plurality of independently-controlled back-lit regions;

obtaining, by a computing system, a non-optimized set of graphics for display by the back-lit HUD system;

performing, by the computing system, an energy consumption analysis of the back-lit HUD system for projection and FALD of the non-optimized set of graphics; and based on the energy consumption analysis, optimizing, by the computing system, the non-optimized set of graphics to obtain an optimized set of graphics for display by the back-lit HUD system to reduce energy consumption by the FALD of the back-lit HUD system, wherein the computing system is an external computing system that is only associated with the back-lit HUD system temporarily in a calibration environment, wherein the back-lit HUD system is further configured to receive and store the optimized set of graphics and to control the projection and FALD of the optimized set of graphics, and wherein the projection and FALD of the optimized set of graphics requires less energy consumption compared to projection and FALD of the non-optimized set of graphics.

9. The calibration method of claim 8, further comprising receiving, by the computing system and from a graphics designer, inputs to optimize the non-optimized set of graphics.

10. The calibration method of claim 8, wherein optimizing the non-optimized set of graphics further comprises laterally shifting a particular graphic of the non-optimized set of graphics such that less energy is consumed by the FALD of the back-lit HUD system.

11. The calibration method of claim 8, wherein optimizing the non-optimized set of graphics further comprises requiring a lesser quantity of the plurality of independently-controlled back-lit regions for the back-lit HUD system.

12. The calibration method of claim 8, wherein optimizing the non-optimized set of graphics comprises allowing for different configurations of the plurality of independently-controlled back-lit regions for the back-lit HUD system.

13. The calibration method of claim 8, wherein the back-lit HUD system comprises:

the surface, wherein the surface includes a back-lit reflective portion of a windshield of the automobile, the back-lit reflective portion of the windshield comprising an array of light-emitting diodes (LEDs) corresponding to the plurality of independently-controlled back-lit regions;

a projection system configured to project light onto the back-lit reflective portion of the windshield; and a control system configured to receive and store the optimized set of graphics from the computing system and to control the projection system and the array of LEDs based on the optimized set of graphics.

14. The calibration method of claim 13, wherein the array of LEDs are a part of thin-film transistor (TFT) system.

* * * * *